United States Patent [19]
Andersson et al.

[11] 4,248,093
[45] Feb. 3, 1981

[54] HOLOGRAPHIC RESOLUTION OF COMPLEX SOUND FIELDS

[75] Inventors: Anders O. Andersson, Seattle; Robert B. Purves, Kent, both of Wash.

[73] Assignee: The Boeing Company, Seattle, Wash.

[21] Appl. No.: 29,632

[22] Filed: Apr. 13, 1979

[51] Int. Cl.³ .............................................. G03H 3/00
[52] U.S. Cl. ...................................................... 73/656
[58] Field of Search ................. 73/656, 655, 603, 604, 73/605; 367/10, 8; 356/347, 348; 350/3.66, 3.6

[56] References Cited

U.S. PATENT DOCUMENTS

| | | | |
|---|---|---|---|
| 2,410,502 | 11/1946 | Hurley | 318/481 |
| 2,545,340 | 3/1951 | Bundy et al. | 73/700 |
| 2,591,666 | 4/1952 | Barkas et al. | 356/358 |
| 2,693,735 | 11/1954 | Zehender | 356/359 |
| 2,855,531 | 10/1958 | Nicoll | 250/483 |
| 3,030,540 | 4/1962 | Mash | 367/7 |
| 3,040,583 | 6/1962 | Post | 73/705 |
| 3,548,643 | 12/1970 | Leith et al. | 73/656 |
| 3,580,082 | 5/1971 | Strack | 73/655 |
| 3,590,640 | 7/1971 | Cindrich | 73/656 |
| 3,679,020 | 7/1972 | Sondhi | 73/604 |
| 3,680,961 | 8/1972 | Rudd | 356/335 |
| 3,683,679 | 8/1972 | Brenden et al. | 73/603 |
| 3,702,737 | 11/1972 | Mottier | 73/655 |
| 3,706,965 | 12/1972 | Korpel | 73/603 |
| 3,711,823 | 1/1973 | Green | 73/603 |
| 3,772,457 | 11/1973 | Macovski | 73/603 |
| 3,886,488 | 5/1975 | Bossaert et al. | 73/603 |
| 3,919,881 | 11/1975 | Metherell | 73/656 |
| 3,996,552 | 12/1976 | Wolber | 73/603 |

*Primary Examiner*—Stephen A. Kreitman
*Attorney, Agent, or Firm*—Christensen, O'Connor, Johnson & Kindness

[57] ABSTRACT

A system for determining the spatial structure or composition of complex sound fields within a duct or other structural enclosure that is excited by acoustic energy is disclosed wherein at least two holograms are recorded and analyzed to provide both the amplitude and phase of the various modal components that comprise the sound field. In situations in which the sound field of interest is periodic, the desired amplitude and phase information is determined from a pair of holograms in which each hologram is formed by photographically recording the diffraction pattern resulting when an array of elastomeric regions, positioned on the wall of the acoustically excited structure, is illuminated by two pulses of coherent monochromatic light that are spaced apart in time by $nT/2$, where T is the period of the dominant acoustic excitation signal and n is an odd integer. In situations in which the sound field is aperiodic, the elastomeric array is sequentially illuminated by a series of monochromatic light pulses with the reflected energy of each pulse being utilized to form separate holographic records. The holographic records resulting from consecutive pulses are then combined to form a number of interferograms. In either case, each of the interferograms are read with a video scanner to supply electrical signals representative of the deflection of each elastomeric region that occurs during the time between those light pulses which caused the interferogram. A computer-implemented Fourier analysis is then performed on the signal record of each interferogram to determine the displacement of each modal component.

7 Claims, 9 Drawing Figures

HOLOGRAPHIC RESOLUTION OF COMPLEX SOUND FIELDS

BACKGROUND OF THE INVENTION

This invention relates to methods and apparatus for determining the characteristics of an acoustic field. More particularly, this invention relates to the determination of the structure of complex sound fields within a duct of other structural enclosure through the use of holographic interferometry.

There are many situations in the field of acoustics wherein it is desirable or necessary to determine the structure of a complex sound field that is induced within a duct-like structure when that structure is acoustically excited by one or more sources of acoustic energy. For example, in the design of modern transport aircraft, a determination of the sound field existing within various portions of the aircraft is important in the design and optimization of acoustically treated structurel. In this regard, it is well-known that lightweight and efficient acoustic treatment systems are both necessary and desirable within the aircraft fuselage section so that the aircraft crew and passengers are not subjected to high noise levels. Further, acoustic treatment of various portions of an engine installation is often undertaken so that the noise propagating from the aircraft engines is minimized.

With respect to the design and optimization of such aircraft noise suppression systems and other situations in which it is desirable or necessary to determine the characteristics of a sound field within duct-like structure or structurally bounded enclosures of various other geometry, it is often advantageous to resolve the sound field into a plurality of spatial wave components or modes which, when linearly combined, provide a substantially complete description of the acoustic field. In this regard, those skilled in the art recognize that the discrete modal components that can exist within any particular structure are determined by the geometry of that structure and by mathematical boundary conditions that reflect various physical constrains (e.g., preserving the continuity of acoustic pressure at an interface between two media having different propagation constant or recognizing that the acoustic particle velocity is zero in a direction normal to a structural boundary). However, since practical situations such as the above-noted design of noise suppression apparatus for aircraft often involve structure of relatively complex geometry and usually involve a number of sources of acoustic energy that cannot be accurately modeled as point sources of spherical waves, a mathematical or theoretical derivation of the sound field that exists in such structure is generally not practical. Thus, a variety of various methods and apparatus have been proposed for accurate experimental determination of acoustic fields.

Often these prior art systems utilize an array of microphones or a single microphone that is moved about within the pressure field to supply electrical signals representative of the acoustic pressure at a plurality of positions within the structure of interest. Although such systems are capable of providing acoustic pressure information that can be analyzed to supply the desired information, several disadvantages and drawbacks are encountered. For example, measurement of the acoustic pressure with a single microphone is extremely time-consuming and since it is necessary to correlate the signal data obtained at the various microphone positions, measurement of even relatively simple time-varying fields is usually not possible. On the other hand, although the utilization of an array of microphones partially eliminates some of these problems, conventional data acquisition systems generally do not provide enough data channels for the simultaneous recording of sufficient pressure information to permit accurate and precise resolution of the pressure field. In this respect, the determination of amplitudes of the various acoustic pressure modes propagating in the inlet duct of a jet engine with an array of microphones would generally require more than one hundred microphones. Since conventional data acquisition systems do not provide for the simultaneous recording of such a large number of signals, repeated measurements are generally necessary and the problems associated with measurement with a single microphone are not completely eliminated. Further, although rather small microphones are available, the placement of one or more microphones in the interior region of structure such as a gas turbine inlet can disrupt or modify the acoustic environment and thereby cause measurement errors. In addition, in some situations it is not possible to place microphones in the structure under consideration without physically modifying that structure and rendering it useless for its intended purpose. For example, it may be necessary to cut openings through the walls of the structure in order to situate the microphones in the acoustic field.

As described in more detail hereinafter, the practice of this invention involves the application of interferometric holography as a means for measuring changes in pressure that occur along the boundary surfaces of a structure that contains or directs acoustic pressure variations. As is known in the interferometric holography art, when an optically reflective transducer diaphragm or other object that is subjected to time-varying displacement due to changes in fluid pressure or mechanical vibration is illuminated by a beam of coherent monochromatic light that is provided by a laser or other source and the light reflected from the diaphragm is combined with a portion of the original illumination, an optical interference pattern that is representative of the displacement of the illuminated object is produced. For example, U.S. Pat. No. 3,548,643 issued to Leith et al. describes a holographic vibration analysis method wherein a vibrating object is illuminated by a single pulse of monochromic coherent light with the pulse length being such that a relatively small displacement of the vibrating object takes place during the time in which the light impinges on the object. The light that is reflected from the object is directed to a photographic plate or other detector which also receives a reference beam that is derived from the laser illumination. The reference beam and the reflected object beam combine to form a diffraction pattern and, in particular, because of the movement of the object during the illumination interval, form an interference pattern that is representative of the displacement occurring during the period of illumination.

Another application of holographic interferometry is disclosed by Cindrich in U.S. Pat. No. 3,590,640 which discloses a sensor for measuring the pressure of a gas or liquid. The pressure sensor disclosed by Cindrich includes a cylindrical pressure chamber with one circular end wall thereof being formed by a diaphragm which deforms at the pressure within the chamber changes. The outer surface of the diaphragm is illuminated with an image of the diaphragm at rest which is reconstructed from a hologram. Thus, interference of the light from the reconstructed holographic image of the diaphragm and the light reflected from the actual diaphragm creates interference fringes whose number and arrangement are indicative of the pressure within the chamber.

The principles of holographic interferometry have also been applied in systems for the optical reconstruction of an acoustically illuminated object, such systems commonly being referred to as acoustical holography. In this respect, U.S. Pat. No. 3,919,881 issued to Metherell disclose a method and apparatus for acoustical holography that does not require an ultrasonic reference wave in order to create an interference pattern that includes both the amplitude and phase information of the signal reflected from an ultrasonically illuminated object. In particular, the Metherell patent discloses a system in which an object to be optically reconstructed is submersed in liquid and illuminated with ultrasonic energy so that wave energy that is reflected from the object impinges on a deformable, diffusely reflecting surface which forms one boundary wall of the tank that contains the illuminated object and the ultrasonic generator. The deformable surface is then illuminated by two relatively short pulses of coherent monochromatic light that are provided by a pulsed laser, with the to pulses of light energy being separated by one half the period of the ultrasonic signal utilized to acoustically illuminate the object. Further, the distance traversed by the second optical pulse is increased by one quarter of an optical wavelength relative to the distance travelled by the first optical pulse. The light energy reflected from the deformable surface during each illumination pulse is caused to impinge on and doubly expose a photographic plate that also receives an optical reference beam that is derived from the laser illumination to thereby form an interferogram. Since the two photographic exposures are separated by a period of time equal to one half a cycle of the acoustic energy, the two exposures result in an interferogram wherein the variations in the optical density of the photographic plate represent twice the actual displacement of the various regions of the deformable surface. Further, since the optical distance travelled by the second illuminating pulse is increased by one quarter of an optical wavelength, this pulse is effectively in phase quadrature with the first illuminating pulse and, as fully described in the Metherell patent, the optical density of the holographic interferometric record is linearly related to the displacement of the deformable surface. Once the interferogram has been formed in the manner disclosed by Metherell, the photographic plate is developed and illuminated with coherent monochromatic light to provide a second photographic record of the deformed surface. Upon development, the second photographic record can be used in a conventional holographic wavefront construction system to generate a visual image of the original object.

Although prior art such as the above-noted patents to Leith et al., Cindrich and Metherell demonstrate the application of holographic interferometry to certain physical situations involving objects that are subjected to vibration or deformation, the apparatus and techniques disclosed therein are not applicable to the previously mentioned situations in which it is necessary to determine the spatial characteristics of a complex sound field propagating through or contained in a structural enclosure. In this respect, and with particular reference to determining the sound field within an aircraft fuselage or portions of an aircraft engine installation such as the air inlet or exhaust systems, the structure being considered is often subjected to mechanical vibration as well as acoustic energy and the disclosed methods of interferometric holography do not provide for distinguishing between the interference pattern that results from the vibration and the interference pattern that results from the acoustic field. Further, present conventional pressure sensors or transducers that are utilized in forming holograms are not amenable to placement within structural enclosures such as the air inlets of gas turbine installations.

Accordingly, it is an object of this invention to provide a method and apparatus for convenient determination of the spatial characteristics of complex sound fields within various acoustically excited structural enclosures wherein little or no modification of the structural enclosure is necessary.

It is another object of this invention to provide a method and apparatus for determining the spatial characteristics of a complex sound field wherein holographic interferometry is employed to overcome the disadvantages encountered with previous measurement systems in which electroacoustic transducers are employed.

It is yet another object of this invention to provide a system for determining the spatial structure of sound fields wherein the structure enclosing or containing the sound field is also subjected to mechanical vibration.

Still further, it is an object of this invention to provide means for rapidly determining the sound field within structures such as an air inlet of an aircraft engine installation wherein such determination can be made with the engine in operation.

SUMMARY OF THE INVENTION

These and other objects are achieved in accordance with this invention by positioning an array of small elastomeric sensors that are responsive to acoustic pressure along the boundary wall of structure which encloses or guides the sound field of interest and illuminating the array with a series of monochromiatic light pulses to form at least two holographic records. Each holographic record is formed on a photosensitive detector such as a conventional photographic plate by a pair of pulses of monochromatic coherent light. In this respect the duration of each light pulse is substantially shorter than the period of the dominant acoustic signal within the acoustic field and the two light pulses are temporally related to one another by nT/2 where T is the period of the dominant acoustic signal and n is an add integer. When the invention is utilized to determine the characteristics of a periodically varying sound field, two such holograms are utilized with the temporal relationship between the two pairs of pulses that form the individual holograms being maintained at mT/4, where m is an odd integer. When an aperiodic sound field is being analyzed, a series of holographic records are formed by a sequence of pulses of monochromic light that are spaced apart by a predetermined time interval. The holographic records associated with each pair of consecutive pulses are than utilized to form a number of interferograms. Regardless of the number of holograms utilized, each interferogram includes a pattern of optical interference fringes that are representative of the differential displacement of the elastomeric sensors occurring between two consecutive pulses of light energy, such displacement including displacement due to the acoustic field and displacement of both the boundary wall and the elastomeric sensors which results from movement or vibration of the structure.

Each interferogram is then scanned with an optical reader to supply an electrical signal representative of the variations in photographic density and the spatial distribution thereof. To permit subsequent signal processing to distinguish between acoustically induced displacement of the elastomeric sensors and displacement due to vibration or movement of the structure, the optical scanning pattern traverses both the individual elastomeric sensors and regions of the structure lying between the sensors. For example, in one disclosed embodiment of the invention wherein individual elastomeric sensors are arrayed in longitudinally extending spaced apart rows and vertically extending spaced apart columns, the optical scanning pattern comprises a series of longitudinal scans in which the optical reading device alternately passes over the center of each elastomeric sensor within a row of sensors and passes longitudinally along the portion of the structure that separates that row of sensors from the next most adjacent row of sensors.

A computer-based Fourier analysis is then performed on the set of electrical signals representative of each of the interferograms to determine the displacement spectrum of the elastomeric sensor array and the region of the structure upon which the array is mounted. For example, with respect to the above-mentioned embodiment of the invention wherein the sensors are arranged in rows and columns, computer implemented fourier analysis is performed for each row of elastomeric sensors and for each of the longitudinally extending regions of the structure that separate adjacent rows of the sensor array. The portion of the spectrum which is due to the acoustic pressure is then obtained by subtracting the displacement spectrum of a longitudinally extending region of the structure from the spectrum obtained from an adjacent row of elastomeric sensors.

The amplitude and phase of the various spatial modes of the acoustic field are then determined by mathematically combining corresponding components of the acoustically induced displacement spectrum. For example and with respect to the determination of a relatively steady or periodic sound field, because the pair of monochromatic pulses that result in the second interferogram are temporally related to the pair of monochromatic pulses that result in the first interferogram by $mT/4$, the displacement amplitude of a particular modal component is equal to $\frac{1}{2}(d_1^2+d_2^2)^{\frac{1}{2}}$, and the phase angle of that modal component is equal to $\tan^{-1}(d_x/d_1)$, where $d_1$ and $d_2$ are the corresponding displacement values of the Fourier spectrum for the two interograms.

In the disclosed embodiments of the invention, each halographic record is formed by conventional holographic apparatus of the type employed to record holograms for the optical reconstruction of an illuminated object and includes a pulsed laser and beam splitting arrangement for forming an object beam and reference beam wherein the portion of the object beam that is reflected from the sensor array and the reference beam are combined for impingement on a photographic plate. Preferably, the laser is of the double pulse variety and is triggered by a control circuit that is responsive to the acoustic signal that is propagating through or in the structure of interest. A microphone or proximity pickup located in the structure that encloses the sound field (or otherwise in acoustic communication with the sound field) provides an electrical signal to te control circuit and the control circuit causes the laser to supply a pair of pulses having the above-mentioned temporal relationship.

In accordance with the invention, the elastomeric sensors are formed from a relatively thin sheet of elastomer such as foam rubber or one of the well-known polyvinyl materials. Preferably, the elastomer sensors include a gas impervious skin layer which is diffusely reflective to the impinging pulses of monochromatic light. Further, the surface of each of the elastomeric sensors is preferably contoured to control the distance between adjacent interference fringes in the interferograms to thereby produce an interference pattern that is amenable to the above-described optical scanning and computer analysis.

BRIEF DESCRIPTION OF THE DRAWING

These and other objects and advantages of the present invention will become apparent to one skilled in the art after reading the following description, taken together with the accompanying drawing in which.

DETAILED DESCRIPTION

Figure 1:
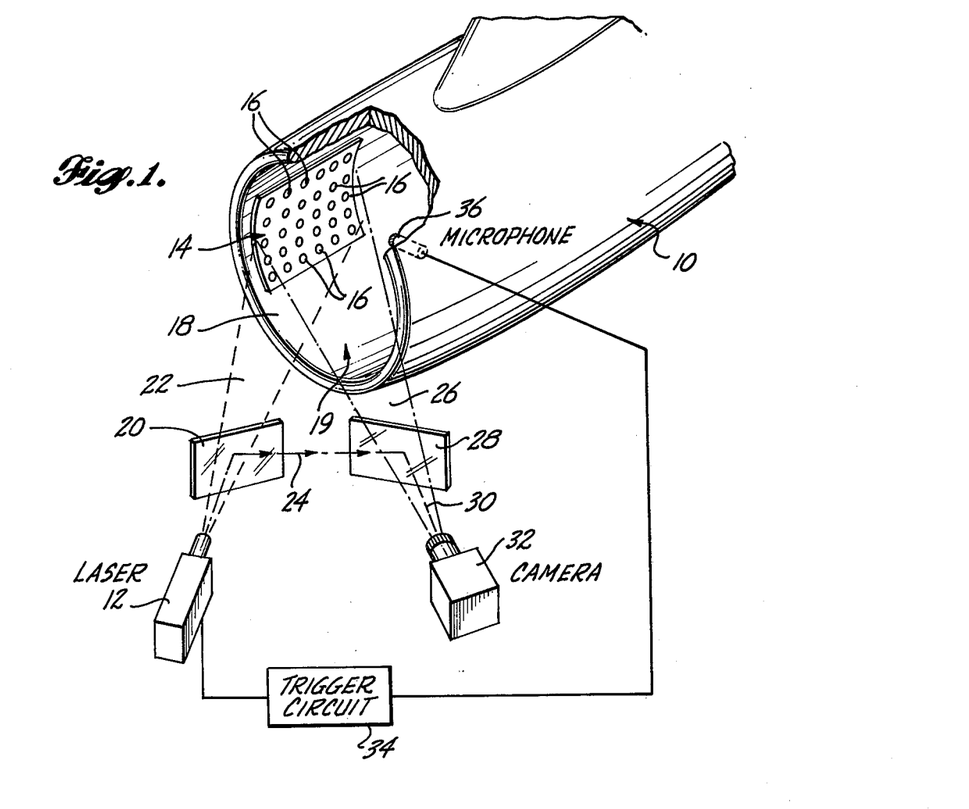
FIG. 1 pictorally represents a system in accordance with this invention for the holographic determination of a complex sound field within the air inlet of an aircraft gas turbine engine installation.

FIG. 1 diagrammatically illustrates an embodiment of this invention for determining the various spatial components or modes of a complex sound field that is induced in the air of a gas turbine engine installation (generally denoted by the numeral 10) of the type typically utilized to propel large aircraft. Upon understanding the invention, those skilled in the art will recognize that the present invention is not limited to the physical situation depicted in FIG. 1, but is applicable to a wide range of situations in which acoustic wave fronts are guided by or contained within enclosing structure of various geometry and it is necessary to determine the spatial characteristics of the acoustic field induced within the enclosing structure. In this respect, the invention is especially advantageous in situations wherein the structure that contains or guides the acoustical energy is also subjected to mechanical vibration. For example, with respect to the arrangement of FIG. 1 wherein the invention is arranged for determining the spatial distribution of noise energy that propagates forwardly from the fan and compressor stages of a gas turbine engine, the entire engine installation 10 is also subjected to mechanical vibration due to operation of the engine.

In the arrangement of FIG. 1, holograms are produced by a conventional laser 12 which supplies pulses of coherent monochromatic light to an array 14 of acoustically deformable elastomeric sensors 16 that is mounted on the inner boundary wall 18 of the engine installation air inlet 19. Each pulse of monochromatic coherent light that is emitted by the laser 12 is directed at a beam splitter 20, which passes a portion of the impinging light that is commonly called the object beam (denoted by the numeral 22 in FIG. 1) and reflects a portion of the impinging light that is known as the reference beam (denoted by the numeral 24 in FIG. 1). The object beam 22 impinges on the elastomeric sensor array 14, which is diffusely reflective, and thereby reflects a portion of the object beam 26. A second beam splitter 28 is positioned within the reflected object beam 26 so as to also intercept the reference beam 24 and recombine a portion of both the reference beam 24 and reflected object beam 26 into a beam 30 which is directed to photosensitive detection equipment 32 (symbolically depicted as a camera in FIG. 1).

Those skilled in the art will recognize that the arrangement of laser 12, beam splitters 20 and 28 and camera 32 schematically depict a typical holographic recording system that is utilized for recording the optical interference pattern between light energy that is reflected from an object and a reference beam. As is known in the art, such a system records both the amplitude and phase of the reflected light so that, when the photographic record or hologram is developed and illuminated by coherent light, a three-dimensional image of the object is created. In this respect, it should be recognized that various holographic recording systems are known to those skilled in the art and that many of these conventional systems are suitable for use in the practice of this invention. For example, such a holographic recording system often includes an arrangement of mirrors and divergent lenses to control and direct the object beam 22, the reference beam 24 and reflected object beam 26 and can also include a lens and photographic plate arrangement other than a conventional camera.

In accordance with the embodiment of the invention depicted in FIG. 1, the laser 12 is energized by a trigger circuit 34 that causes the laser 12 to provide a series of light pulses having a predetermined temporal relationship. More specifically, when the arrangement of FIG. 1 is utilized to determine the spatial characteristics of a periodic sound field, the trigger circuit 34 causes the laser 12 to supply a first relatively short pulse of coherent light energy (e.g., typically having a pulse with less than 10% of the periodic of the dominant acoustic signal frequency) when system operation is initiated and causes the laser 12 to supply a second relatively short pulse of coherent light at a time equal to nT/2, where T is the period of the dominant acoustic signal and n is an odd integer. Further, the trigger circuit 34 is configured and arranged so that a second photographic record can be obtained with a second pair of coherent light pulses wherein the first pulse of the second pair of light pulses is temporally related to the final pulse of the first pair of light pulses by mT/4, where m is an odd integer. It will be recognized by those skilled in the art that various analog or digital circuit arrangements can be utilized within the trigger circuit 34 to provide the laser 12 with trigger pulses having the above-described temporal relationships. In this respect, the trigger circuit 34 is supplied an electrical signal by a microphone 36 or other conventional transducer such as an electromagnetic or electrostatic proximity pickup that is placed in the interior region of the structure containing the acoustic field of interest (or physically attached to such structure) so as to supply an electrical signal representative of the dominant acoustic signal guided by or contained in the structure (e.g., the air inlet 19 of the engine installation 10 of FIG. 1). To supply the desired trigger pulses, the trigger circuit 34 can include, for example, a conventional comparator circuit or other type of circuit which supplies a signal pulse each time the signal supplied by the microphone 36 passes through a predetermined level (e.g., a "peak picker" circuit or zero crossover detector). Each of these conventional circuits supply a signal having a pulse repetition rate that is substantially equal to one-half the period of the dominant acoustical signal. By coupling this signal to a conventional digital frequency doubler, a signal having a pulse repetition rate equal to one-fourth the period of the dominant acoustic signal can be supplied and conventional counter circuits can be interconnected to receive the frequency multiplied signal and supply trigger pulses having the previously described temporal relationships.

Regardless of the exact configuration of the trigger circuit 34, each time the laser 12 supplies a pair of monochromatic pulses, a doubly exposed hologram is recorded by the photosensitive detector 32. Since each exposure forms a holographic record that is, in effect, an instantaneous representation of the deflection of various regions within the illuminated area, the superimposed holograms form an interferogram wherein the photographic density and spacing of the interference fringes represent the differential deflection that occurred in the time interval between the two light pulses. Thus, with reference to the arrangement of FIG. 1, if the inner wall 18 of the engine installation 10 were stationary with respect to time and a simple periodic plane wave were propagating outwardly from the forward opening of the engine installation 10, an integerogram formed in the above-described manner would include a series of annular, concentric interference fringes centered about positions corresponding to the midpoint of each elastomeric sensor 16. However, since operation of the gas turbine engine causes vibration of the boundary wall 18 and hence the elastomeric sensor array 14, typical interferograms formed in the practice of this invntion often include a more complex pattern of interference fringes that represent both the relatively high amplitude, low frequency, vibration of the inner wall 18 and the higher frequency, lower amplitude acoustic deflection of the elastomeric sensors 16. As shall be described in more detail hereinafter, in accordance with this invention, computer implemented analysis of a signal representative of the composite interference pattern of each interferogram separates the acoustic displacement components from the combined acoustic and mechanical displacement information that is contained therein.

As is illustrated in FIG. 1, the sensor array 14 includes a plurality of elastomeric sensors 16 that are spaced apart from one another and cover a region of the structure under consideration that is usually on the order of a few square feet. Although the elastomeric sensors 16 can be positioned to form arrays of various geometry, it is usually advantageous to arrange the sensors 16 in a rectangular array in which the sensors form longitudinally extending spaced apart rows and vertically extending spaced apart columns. Regardless of the geometry of the array, each of the elastomeric sensors 16 is constructed of a conventional elastomer such as foam rubber or one of the well-known polyvinyl materials that include internal voids. In this respect, the material utilized is selected to exhibit a mechanical compliance which results in relatively small deflection values when the sensors 16 are subjected to the acoustic field under study. Further, the size of each elastomeric sensor 16 is generally determined in view of the compliance value so that the interferogram that is formed by the two pulses of laser light includes a sufficient number of interference fringes in the region corresponding to each elastomeric sensor 16. In addition, it is often advantageous to establish the contoure of each elastomeric sensor 16 to control the spacing between the interference fringes of the interferograms.

Figure 2A:
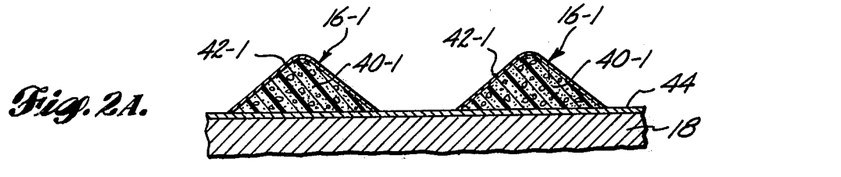
FIGS. 2a, 2b and 2c are cross-sectional views of three different arrays of elastomeric sensors that are suitable for use in the practice of this invention.
Figure 2B:
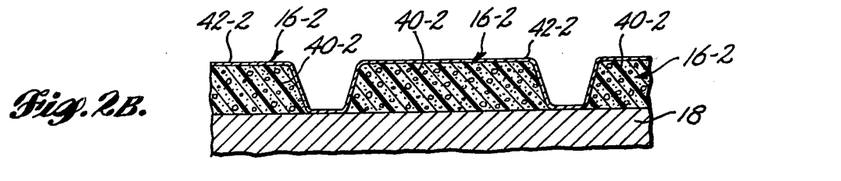
Figure 2C:
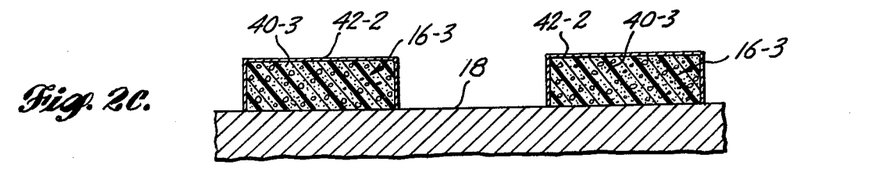

More specifically, FIGS. 2a through 2c illustrate partial cross-sectional views of three different sensor arrays that are useful in the practice of this invention. In eacy of the arrays of FIGS. 2a through 2c, the individual elastomeric sensors can be of various geometry (e.g., circular or rectangular) and each array of sensors includes a foam-like elastomeric core material that establishes the pliancy of the sensors and includes a gas impervious surface layer that is diffusely reflective relative to the impinging laser illumination. As can be seen by comparing FIGS. 2a through 2c, the depicted sensor arrays primarily differ in the surface contour of each individual sensor and the spacing between such sensors. For example, with reference to FIG. 2a, each individual sensor 16-1 includes an elastomeric core region 40-1 and a gas impervious skin layer 42-1 which can be integrally formed by conventional manufacturing techniques that increase the density of the surface material, or can be a separate sheet material that is bonded to the surface of the core 40-1. Further, if desirable or necessary, the outer surface of the surface layer 42-1 can be coated with a number of conventional materials to provide the desired amount of light reflection. Since each elastomeric sensor 16-1 of FIG. 2a has a generally triangular cross-sectional geometry, it can be recognized that the mechanical compliance exhibited by each elastomeric sensor 16-1 is not constant at each position throughout the surface of the sensor, but varies as a function of the thickness of the sensor at that particular location. That is, since the core material 40-1 is of a relatively uniform density and pliancy, the central region of each elastomeric sensor 42-1 yields more easily to acoustic pressure than do regions of the elastomeric sensor that are located outwardly of the central region. Since the interference fringes that are produced on the interferogram correspond to the locus of points on the surface of the sensor 16-1 that are deflected by equal amounts, it can thus be seen that use of the sensor array depicted in FIG. 2a will decrease the spacing between adjacent interference fringes in the central region of each sensor 16-1 as compared to regions of each sensor 16-1 that are located near the sensor boundary regions.

Like the sensor array depicted in FIG. 2a, each elastomeric sensor 16-2 and 16-3 of the arrays depicted in FIGS. 2b and 2c includes an elastically deformable core region (40-2 and 40-3 respectively) and a gas impervious, diffusely reflective skin layer (42-2 and 42-3 respectively). However, neither the elastomeric sensors 16-2 of the array depicted in FIG. 2b nor the elastomeric sensors 16-3 of the array depicted in FIG. 2c are contoured to the same extent as the elastomeric sensors 16-1 of FIG. 2a. In this regard, comparing the array of FIG. 2a with the array of FIG. 2b it can be noted that each elastomeric sensor 16-2 is of a relatively constant thickness throughout the major portion of each sensor with the region near the boundary of the sensor rapidly decreasing the thickness so that adjacent sensors are separated by a region that basically consists of the skin layer 42-2. In this regard, the array of FIG. 2b can be formed as a single sheet of integrally formed spaced apart sensors, whereas the individual sensors of the arrays depicted in FIGS. 2a and 2c generally must be bonded to a flexible carrier sheet or individually bonded to the wall region being illuminated. For example, with reference to FIG. 2a, the depicted sensors 16-1 are bonded or otherwise mounted on a thin, flexible sheet 44 which can be temporarily bonded to the inner boundary wall 18 of the gas turbine engine installation air inlet duct. For example, the lower surface of the flexible carrier sheet 44 can include a coating of adhesive material so that the array of FIG. 2a is pressure sensitive and can be easily applied to the desired portion of the boundary wall 18. In this regard, the lower surface of the sensor array depicted in FIG. 2bl and the lower surface of each individual elastomeric sensor 16-3 of FIG. 2c can also be provided with such an adhesive coating to facilitate mounting on the boundary wall 18.

In operation of the invention to determine the spatial distribution of a relatively steady or periodic sound field, two holographic interferograms are formed in the above-described manner and the interferograms are analyzed to determine the amplitude and phase constants of each modal component within the sound field. In this respect, the trigger circuit 34 of FIG. 1 causes the laser 12 to twice illuminate the sensor array 14 with the period between the laser pulses being substantially equal to nT/2 to form the first interferogram. A second photographic plate is then placed in the camera 32, or other suitable photographic apparatus, and the trigger circuit 34 causes the laser 12 to supply a second pair of illuminating pulses that are also separated by nT/2 and, additionally, wherein the time period between the final pulse of the first pulse pair and the initial pulse of the second pulse pair is equal to mT/4. Both the first and second interferograms are then photographically processed to provide a photographic print or transparency that is amenable to optical "reading" techniques.

Figure 3:
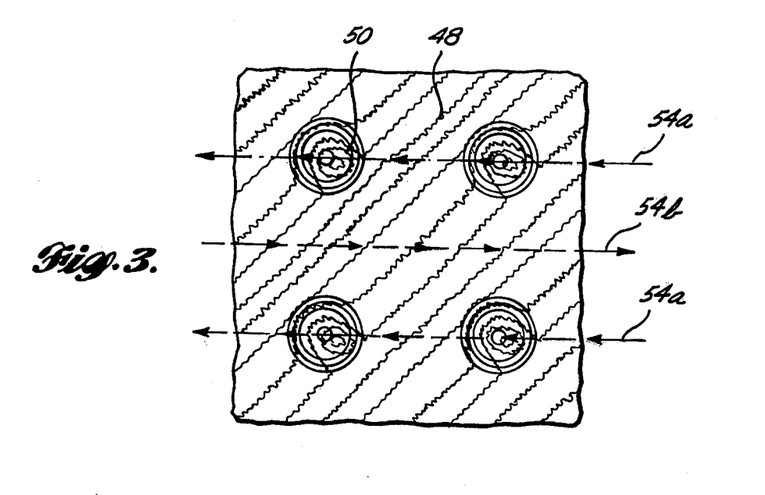
FIG. 3 illustrates the optical interference pattern of a typical interferogram recorded in accordance with this invention wherein the structure to which the array of elastomeric sensors is mounted is subjected both to an acoustic field and to mechanical vibration.
Figure 4:
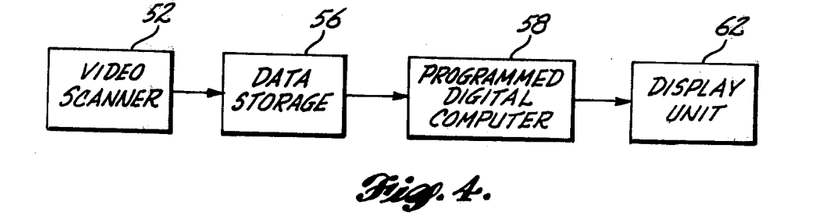
FIG. 4 is a block diagram of a data processing system for analyzing the interferograms.
Figure 5:
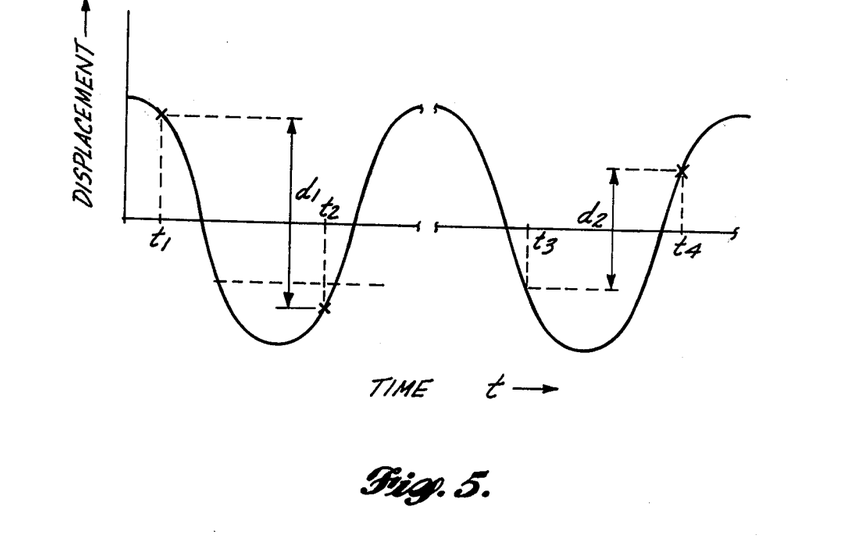
FIG. 5 is a simplified graph of displacement versus time for a single elastomeric sensor that is useful in understanding the operation of the system depicted in FIG. 1.

The process utilized in determineding the amplitude and phase information from the two interferograms can be understood by reference to FIGS. 3 through 5. In this regard, FIG. 3 depicts a portion of a typical interferogram that is formed in the above-described manner; FIG. 4 is a block diagram of optical scanning and computational apparatus that is utilized to determine the amplitude and phase information; and, FIG. 5 is a graph that depicts the displacement of a single elastomeric sensor when a single frequency plane wave propagates outwardly from the entrance opening of the air inlet 19 of FIG. 1. As is depicted in FIG. 3, vibration and movement of the engine installation 10 during the formation of each interferogram causes the optical interference pattern to include a plurality of "background fringes" 48 as well as optical interference fringes 50 that represent both displacement due to vibration and acoustic displacement of the surface of each elastomeric sensor 16. In this respect, as is illustrated in FIG. 2, the relatively high amplitude, low frequency mechanical vibration of the inner wall 18 causes the acoustic interference fringes that are located near the central region of each elastomeric sensor 16 to be radially displaced whereas the acoustically induced interference fringes located near the periphery of the elastomeric sensor 16 tend to blend into the background fringes 48.

To provide data representative of the optical interference pattern, an optical scanner such as a conventional video scanning unit (52 in FIG. 4) is operated to alternately scan along a portion of the interferogram that corresponds to a set of the sensors 16 (e.g., a row of sensors) and to scan along a portion of the interferogram that corresponds to a region of the duct wall 18 that separates one set of elastomeric sensors 16 from another set of the sensors 16. For example, as is depicted in FIG. 3, such a scanning sequence new consist of a series of horizontal scans 54a that pass over the region of the inteferogram that includes the acoustically induced fringes 48 and a set of horizontal scans 54b that pass over a region of the interferogram that corresponds to regions of the sensor array 14 between the rows of sensors 16 and hence thereby includes only the background fringes 48. Although a variety of scanning patterns can be employed, e.g., "column-wise scanning" or scanning in a diagonal, each scanning sequence utilized in the practice of this invention suplies a collection of data comprising clearly identifiable data subsets that represent the optical interference produced by the acoustically and mechanically induced displacement of the elastomeric sensors 16 and identifiable data subsets that represent the vibration induced displacement of portions of the structure lying between the elastomeric sensors 16. For example, and with continued reference to the scanning portion depicted in FIG. 3, during each horizontal scan 54a the optical scanner 52 supplies a digitally encoded signal that represents the acoutically induced and mechanically induced displacement of the elastomeric sensors 16 lying within a particular row of the sensor array 16 and during each scan 54b the optical scanner 52 supplies a digitally encoded signal representative of the vibration induced displacement of that portion of the wall 18 that lies between adjacent rows of the elastomeric sensors 16. As is indicated in FIG. 4, the digitally encoded signals supplied by the optical scanner 52 are stored within a conventional data storage unit 56 which can be, for example, a conventional digital tape recorder or disc stoage unit.

When the displacement data of the two interferograms has been stored in data storage 56, the infomation is accessed by a conventional digital computer 58 that is programmed to perform a Fourier analysis on each data set (e.g., the collection of data representing the scanning paths 54a and 52b of FIG. 3). In this respect, various computer-based Fourier analysis schemes can be utilized such as that commonly identified as the "Fast Fourier Transform." Further, depending on the particular situation at hand, the Fourier analysis can be performed with respect to the coordinate direction of the scanning paths utilized, or can be performed to supply deflection information relative to more than one coordinate of the structure under study. For example, with respect to the embodiment of the invention depicted in FIG. 1 and the scanning pattern of FIG. 3, one-dimensional Fourier analysis can be performed relative to the depicted horizontal scans to thereby supply deflection data pertinent to a coordinate extending axially along the inlet duct 19, or a twodimensional Fourier analysis can be utilized wherein both the rows and columns of the elastomeric sensor array 14 are considered to also yield the spatial distribution of the sound field within the air inlet 18 along an angular coordinate, i.e., the spatial distribution of the sound field along peripheral traces on the inner wall 18 that are substantially perpendicular to the axial centerline of the air inlet 19.

Regardless of whether single or two-dimensional Fourier analysis is utilized, the digital computer 58 determines the spectral components of the acoustic pressure differential that occur along the illuminated portion of the air inlet wall 18 during the interval between the pulses of monochromatic light. The acoustically induced portion of the displacement spectrum is then determined by subtracting portions of the spectrum which represent the background optical fringes from portions of the spectrum which include both acoustically induced displacement and vibration of the inlet wall 18. For example, with reference to the scanning pattern of FIG. 3, the Fourier components determined by analyzing the optical fringe pattern along a scanning path 54b can be subtracted from the Fourier components of the optical fringe pattern along a scan line 54a to yield the spectral content of the acoustically induced displacement. Once each of the interferograms have been processed in this manner, the amplitude and phase constant of each model component can be determined by mathematically combining corresponding deflection data derived from each of the interferograms.

The manner in which the amplitude and phase constants are determined from the spectral components of the two interferograms can be understood by reference to FIG. 5, which illustrates the time dependent displacement of an individual elastomeric sensor 16 when the air inlet 19 is excited by a single frequency acoustic signal that propagates outwardly through the forward opening of the air inlet 19. In the depicted situation, the laser 12 is triggered at times $t_1$ and $t_2$ to form the first interferogram and is again triggered at the times $t_3$ and $t_4$ to form the second interferogram with $t_2-t_1$ and $t_4-t_3$ being equal to an odd integer multiple of $T/2$ and the time interval between $t_2$ and $t_3$ being equal to an odd integer multiple of $T/4$. Since the displacement diagrams for each of the elastomeric sensors 16 would be substantially identical to the displacement diagram of FIG. 5, the Fourier analysis of the first interferogram would yield a displacement value substantially equal to the differential displacement $d_1$ depicted in FIG. 5 and the Fourier analysis of the second interferogram would yield a differential displacement substantially equal to $d_2$ in FIG. 5. Because the second pair of monochromatic light pulses are, in effect, in phase quadrature with respect to the depicted acoustic pressure wave, the displacements $d_1$ and $d_2$ can be combined through the use of known trigonometric identities to yield the desired amplitude and phase constants. In this regard, it can be recognized that the acoustic pressure wave depicted in FIG. 5 can be mathematically represented as $u = A \cos(\omega t + \phi)$, where $A$ and $\phi$ are the unknown amplitude and phase constants, respectively, and $\omega$ is the frequency of the dominant acoustic wave in radians per second, i.e., the angular frequency of the signal supplied by the microphone 36 in FIG. 1. Applying the above-described temporal relationships it can be seen that $d_1 = 2A \cos \omega t$ and $d_2 = 2A \cos(\omega t + \pi/2)$, which is identically equal to 2 A sin ωt. Hence it can be recognized that $A = \frac{1}{2}(d_1^2 + d_2^2)^{\frac{1}{2}}$ and $\phi = \tan^{-1}(d_2/d_1)$. Although it can be noted that the algebraic sign of the tangent of $\phi$ is unknown (since the algebraic sign of the displacement components $d_1$ and $d_2$ are unknown), this ambiguity can be resolved by considering the solution for other elastomeric sensors 16 of the array 14 and recognizing that the overall pressure pattern must vary smoothly in each coordinate direction, e.g., along the rows or columns of a rectangular sensor array.

Since periodic acoustic pressure patterns that are more complex than the situation depicted in FIG. 5 can be considered to be the superposition of a plurality of sinusoidal signals, those skilled in the art will recognize that the above analysis technique can be applied to provide the amplitude and phase constants of each modal component of the spatial pressure field within structure such as the air inlet 19 of FIG. 1. In this regard, the computer 58 is programmed to calculate the phase and amplitude constants of each such modal component and supply the desired information to a display unit (62 in the arrangement of FIG. 4). Depending on the particular application of the invention, the display unit 62 can be a conventional cathode ray tube display, a conventional printing device or any other such device that is commonly utilized to indicate the results of a digital computing process.

Although the above-described system and method of operation are suitable for determining the spatial characteristics of a periodic acoustic field, the above-described arrangement and technique is preferably modified somewhat when the acoustic excitation is aperiodic in nature. With reference to FIG. 7, when the structure under consideration is excited by an aperiodic acoustic signal such as that depicted in FIG. 6, the recombined reflected object beam 26 and reference beam 24 is directed to a prism 64 that is rotated by a motor element 66. The prism 64 directs the recombined light energy through a lens 68, which is rotated by a second motor element 70. The lens 68 is a conventional divergent lens arrangement which focuses the light energy on a single segment or frame 72 of a filmstrip 74 which is mounted and arranged such that each point on the surface of the filmstrip 74 is substantially equidistant from the center of rotation of lens 68.

In operation, the motors 66 and 70 are activated by the trigger circuit 34 of FIG. 1 to rotate the prism 64 and lens 68 through an incremental angle which focuses the image projected by the lens 68 on the nextmost frame 72 of the filmstrip 74 each time the laser 12 supplies a pulse of monochromatic light. The rotational speed of the prism 64 and lens 68 are preferably established to compensate for movement of the prism 64 that may take place during the period of laser illumination. Thus, the image projected on the filmstrip 74 is substantially stationary during each pulse of light energy (exposure period). Further, a conventional Kerr cell shutter arrangement can be utilized in the arrangement of FIG. 7 to further eliminate the effect of rotating the prism 64.

Figure 6:
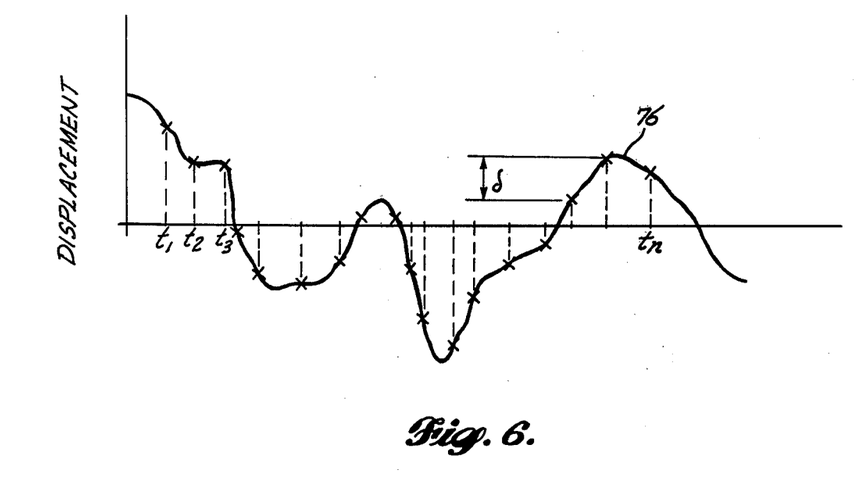
FIG. 6 is a graphic representation of the deflection of a single elastomeric sensor when an aperiodic acoustic field is introduced in structure such as the air inlet of FIG. 1.
Figure 7:
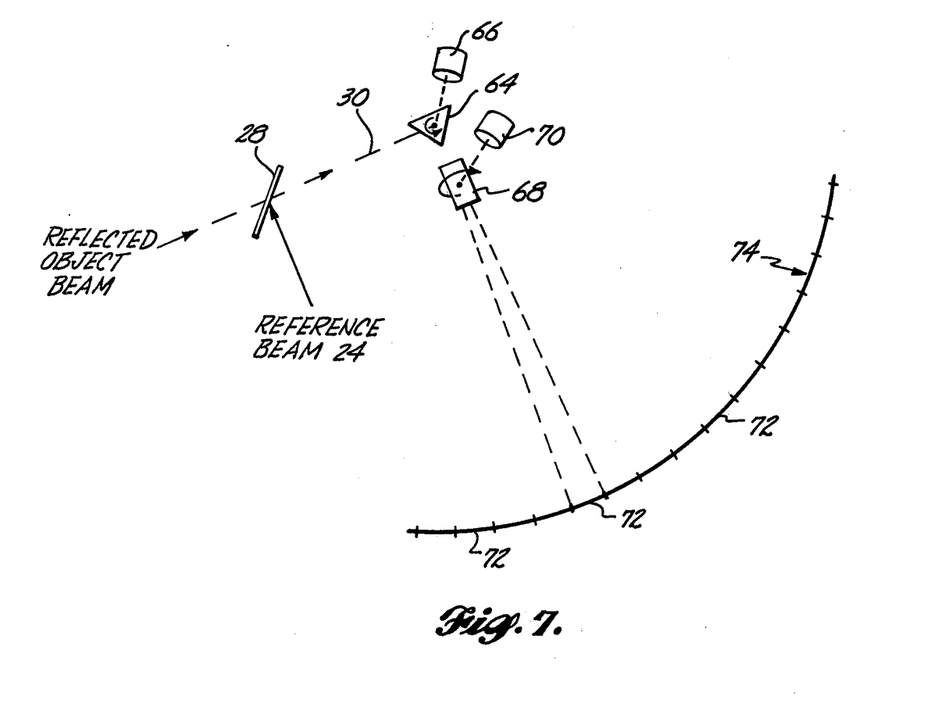
FIG. 7 schematically represents modification of the system of FIG. 1 to determine the spatial characteristics of an aperiodic acoustic field such as that depicted in FIG. 6.

As is indicated in FIG. 6, in the above-described arrangement of FIG. 7, the trigger circuit 34 fires the laser 12 to form a single holographic record on each of the individual frames 72 of the filmstrip 74 that corresponds to the displacement or deformation of the elastomeric sensor array 14 at a particular time period. For example, with respect to the aperiodic signal 76 of FIG. 7, individual holographic records are formed at times $t_1$, $t_2, \ldots, t_n$, where n is an integer denoting the total number of exposures and a constant time interval $\Delta t$ separates each exposure (pulse of monochromatic light).

When the sequence of holographic records is complete and the filmstrip 74 is developed, pairs of the holographic records are utilized to form a number of interferograms that can be read with optical scanning equipment such as the videoscanner 52 of FIG. 4, and computer processed to determine both the spatial and time varying characteristics of the pressure field in the region of the structure being observed that contains the elastomeric sensor array 14 (FIG. 1). More specifically, the holographic records obtained at each pair of consecutive times $t_1$-$t_2$, $t_2$-$t_3$, ..., $t_{n-1}$-$t_n$ in FIG. 6 can be illuminated by coherent monochromatic light so as to be superimposed on a photographic film or plate to form an interferogram in which the optical interference fringes represent the displacement of the surface during the time $\Delta t$ that elapses between the two times associated with that particular pair of exposures. As in the case of the previously described periodic signal situation, the spatial characteristics of the sound field during the period of each interferogram can then be determined by Fourier analysis within the programmed computer 58. The temporal characteristics of the acoustic field can then be determined in a similar manner within the computer 58 by performing an additional Fourier analysis based on the incremental changes in amplitude and phase that occur between each of the interferometric records.

The embodiments of the invention in which an exclusive property or privilege is claimed are defined as follows:

1. Apparatus for determining the spatial distribution of an acoustic field along a boundary wall of an acoustically excited structure, said apparatus comprising:
   a sensor array mounted to at least a portion of said boundary wall of said acoustically excited structure, said sensor array including a plurality of individual spaced apart sensors of predetermined geometry, each of said individual sensors being elastically deformable by incident acoustic energy, each of said sensors including a surface layer that is diffusely reflective to impingent light energy;
   holographic recording means for supplying at least two holographic records of light energy reflected from said sensor array, said holographic recording means including a source of monochromatic light energy for selectively generating pulses of monochromatic light in response to an applied trigger signal, first optical means for directing a portion of each pulse of said monochromatic light to said sensor array and for forming a reference beam, second optical means for receiving and combining said reference beam and at least a portion of the monochromatic light reflected from said sensor array, and photosensitive recording means for recording an image representative of said combined light supplied by said second optical means;
   detector means positioned for response to said acoustic field within said acoustically excited structure, said detector means including for supplying a signal having a frequency substantially equal to that of the dominant acoustic signal within said acoustically excited structure; and
   trigger means responsive to said signal supplied by said detector means for supplying said trigger signal to said source of monochromatic light at a frequency substantially equal to said dominant acoustic signal within said acoustically excited structure, said trigger means including means for supplying a first pair of trigger signals to said source of monochromatic light that are spaced apart in time by nT/2, where n is an odd integer and T is the period of said dominant acoustic signal, said first pair of trigger signals causing said source of monochromatic light to doubly expose said photosensitive means and form a first holographic interferogram, said trigger means further including means for supplying a second pair of trigger signals that are spaced apart in time by nT/2 with the first trigger signal of said second pair of trigger signals being spaced apart in time from the final trigger signal of said first pair of trigger signals by mT/4, where m is an odd integer, said second pair of trigger signals causing said source of monochromatic light to doubly expose said photosensitive means and form a second holographic interferogram.

2. Apparatus for determining the spatial distribution of an acoustic field along a boundary wall of an acoustically excited structure, said apparatus comprising:

a sensor array mounted to at least a portion of said boundary wall of said acoustically excited structure, said sensor array including a plurality of individual spaced apart sensors of predetermined geometry, each of said individual sensors being elastically deformable by incident acoustic energy, each of said sensors including a surface layer that is diffusely reflective to impingent light energy;

holographic recording means for supplying at least two holographic records of light energy reflected from said sensor array, said holographic recording means including a source of monochromatic light energy for selectively generating pulses of monochromatic light in response to an applied trigger signal, first optical means for directing a portion of each pulse of said monochromatic light to said sensor array and for forming a reference beam, second optical means for receiving and combining said reference beam and at least a portion of the monochromatic light reflected from said sensor array, photosensitive recording means including a photosensitive material that is subdivided into a plurality of separate photosensitive regions; and means for exposing said separate photosensitive regions with said combined light supplied by said second optical means to form a sequence of images in which each image is representative of the combined light supplied in response to a different one of said trigger signals, consecutive pairs of said images being superimposable on one another to form a plurality of interferograms; and trigger means for periodically supplying said trigger signal to said source of monochromatic light, said trigger means including timing means for supplying said trigger signal at predetermined time intervals.

3. The apparatus of claim 1 or 2 further comprising optical scanning means operable for sequentially scanning each of said interferograms along a plurality of scanning paths, said optical scanning means including means for supplying a signal record representative of variations in the optical density along each scanning path of an interferogram; and programmed computer means for processing said signal record of each scanning path to determine the amplitude and phase value of the acoustic signal components of said acoustic field along said scanning path.

4. The apparatus of claim 3 wherein said individual sensors of said sensor array are arranged in a series of spaced apart columns and spaced apart rows, said optical scanning pattern including a first plurality of scanning paths which sequentially traverse a number of adjacent individual sensors and a plurality of second scanning paths that are substantially parallel to said first scanning paths and traverse a region of said boundary wall which separates adjacent individual sensors of two of said first scanning paths, said programmed computer being further programmed to subtract the amplitude and phase values of each acoustic signal component along each of said second scanning paths from the amplitude and phase values of the same acoustic signal component along an adjacent one of said first scanning paths to substantially prevent errors arising due to mechanical displacement of said boundary wall.

5. A method for determining the spatial distribution of a sound field at the boundary wall of an acoustically excited structure comprising the steps of:

(a) mounting an array of spaced apart acoustic transducers over at least a portion of said boundary wall, each individual transducer within said array being elastically deformable in response to incident sound energy;

(b) determining the period, T, of the dominant acoustic signal within said sound field;

(c) irradiating said array of acoustic transducers with a pulse of coherent light of a time duration substantially shorter than T to form a reflected pulse of light;

(d) optically combining at least a portion of said pulse of coherent light that impinges on said array of acoustic transducers with at least a portion of said reflected pulse of light to form a first optical diffraction pattern;

(e) exposing a photosensitive material to said first optical diffraction pattern to form a photographic image thereof;

(f) forming a second optical diffraction pattern by irradiating said array of acoustic transducers with a pulse of coherent light that is supplied at a time nT/2 subsequent to the time at which said pulse of coherent light of said first optical diffraction pattern is supplied, where n is an odd integer;

(g) exposing a photosensitive material to said second optical diffraction pattern to form a photograhic image thereof;

(h) superimposing said photographic images of said first and second optical diffraction patterns to provide an interfermoetric record representative of the differential displacement of said transducers within said array of transducers and the region of said boundary wall upon which said array is mounted;

(i) repeating steps (c), (d), (e), (f), (g) and (h) to form a second interferometric record with the first pulse of coherent light for forming said second interferometric record being generated at a time mT/4 subsequent to the generation of said second pulse of coherent light for forming said first interferometric record, where m is an odd integer;

(j) optically scanning each of said first and second interferometric records along a plurality of predetermined scanning paths to supply a set of signals representative of variations in optical density along each scanning path; and (k) processing said signals to determine the amplitude and phase constants of the modal components of said sound field.

6. The method of claim 5 wherein the step of superimposing said optical diffraction patterns comprises the step of doubly exposing a single photosensitive material.

7. The method of claim 5 or 6 wherein the step of optically scanning each of said interferometric records includes the steps of scanning along a first plurality of substantially parallel scanning paths that correspond to paths which sequentially traverse individual ones of said acoustic transducers and scanning along a second plurality of scanning paths that are interlaced with and substantially parallel to said first scanning paths wherein each scanning path of said second plurality of scanning paths traverses regions or said interferometric record that correspond to regions of said array of acoustic transducers not occupied by said acoustic transducers; and wherein said step of processing said signals includes determining the Fourier components of said signals corresponding to scanning paths of said first plurality of scanning paths, determining the Fourier components of said signals corresponding to scanning paths of said second plurality of scanning paths, and subtracting the Fourier components of each scanning path of said plurality of second scanning paths from the corresponding Fourier components of an adjacent one of said scanning paths of said first plurality of scanning paths.

* * * * *

UNITED STATES PATENT AND TRADEMARK OFFICE
CERTIFICATE OF CORRECTION

PATENT NO. : 4,248,093
DATED : February 3, 1981
INVENTOR(S) : Anders O. Andersson et al.

It is certified that error appears in the above-identified patent and that said Letters Patent are hereby corrected as shown below:

Column 1, line 10: "of" is changed to --or--.

Column 1, line 20: "structurel" is changed to --structural--.

Column 2, line 67: "at" is changed to --as--.

Column 3, line 13: "disclose" is changed to --discloses--.

Column 3, line 27: "to" is changed to --two--.

Column 4, line 43: "monochromiatic" is changed to --monochromatic--.

Column 4, line 53: "add" is changed to --odd--.

Column 4, line 60: "monochromic" is changed to --monochromatic--.

Column 5, line 32: "fourier" is changed to --Fourier--.

Column 5, line 52: "$\tan^{-1}(d_x/d_1)$" is changed to --$\tan^{-1}(d_2/d_1)$--.

Column 5, line 56: "halographic" is changed to --holographic--.

Column 6, line 2: "te" is changed to --the--.

Column 7, line 58: "periodic" is changed to --period--.

Column 8, line 46-47: "integerogram" is changed to --interferogram--.

Column 8, line 54: "invntion" is changed to --invention--.

Column 9, line 21: "contoure" is changed to --contour--.

Column 9, line 27: "eacy" is changed to --each--.

Column 10, line 29: "FIG. 2b1" is changed to --FIG. 2b--.

Column 10, line 53: "determineding" is changed to --determining--.

Column 11, line 20: "new" is changed to --can--.

UNITED STATES PATENT AND TRADEMARK OFFICE
CERTIFICATE OF CORRECTION

PATENT NO. : 4,248,093

DATED : February 3, 1981

INVENTOR(S) : Anders O. Andersson et al.

It is certified that error appears in the above-identified patent and that said Letters Patent are hereby corrected as shown below:

Column 11, line 30: "suplies" is changed to --supplies--.

Column 11, line 40: "acoutically" is changed to --acoustically--.

Column 11, line 51: "stoage" is changed to --storage--.

Column 12, line 3: "twodimensional" is changed to --two-dimensional--.

Column 13, line 8: "var" is changed to --vary--.

Column 14, line 62: --means-- is inserted after "including".

Column 15, line 20: "halo" is changed to --holo--.

Column 16, line 53: "interfermoetric" is changed to --interferometric--.

Signed and Sealed this

Fourteenth Day of July 1981

[SEAL]

Attest:

GERALD J. MOSSINGHOFF

Attesting Officer  Commissioner of Patents and Trademarks